US008286662B2

(12) United States Patent
Weh et al.

(10) Patent No.: US 8,286,662 B2

(45) Date of Patent: Oct. 16, 2012

(54) SWITCHING VALVE WITH SLIDER

(76) Inventors: Erwin Weh, Illertissen (DE); Wolfgang Weh, Illertissen (DE)

( * ) Notice: Subject to any disclaimer, the term of this patent is extended or adjusted under 35 U.S.C. 154(b) by 690 days.

(21) Appl. No.: 12/375,400

(22) PCT Filed: Jul. 27, 2007

(86) PCT No.: PCT/EP2007/006654

§ 371 (c)(1), (2), (4) Date: May 6, 2009

(87) PCT Pub. No.: WO2008/012095

PCT Pub. Date: Jan. 31, 2008

(65) Prior Publication Data

US 2009/0314362 A1 Dec. 24, 2009

(30) Foreign Application Priority Data

Jul. 27, 2006 (DE) .................... 20 2006 011 681 U

(51) Int. Cl.
*F16K 31/363* (2006.01)

(52) U.S. Cl. ...................... 137/492.5; 137/218; 137/487

(58) Field of Classification Search .................. 137/218, 137/107, 487, 492.5
See application file for complete search history.

(56) References Cited

U.S. PATENT DOCUMENTS

| | | | | |
|---|---|---|---|---|
| 3,753,447 | A * | 8/1973 | Davis et al. | 137/596 |
| 5,056,549 | A * | 10/1991 | Bouilloux et al. | 137/218 |
| 6,769,450 | B2 | 8/2004 | Fretwell | |
| 6,926,310 | B1 * | 8/2005 | Weh et al. | 285/316 |

FOREIGN PATENT DOCUMENTS

| | | | |
|---|---|---|---|
| EP | 0351319 | B1 | 1/1990 |
| EP | 0579355 | A1 | 1/1994 |
| EP | 1239201 | A1 | 9/2002 |
| GB | 1321639 | A | 6/1973 |
| WO | WO 9805898 | A1 | 2/1998 |
| WO | WO 0052378 | A1 | 9/2000 |

* cited by examiner

*Primary Examiner* — Craig Schneider

(74) *Attorney, Agent, or Firm* — Knobbe Martens Olson & Bear LLP

(57) ABSTRACT

Disclosed herein is a switching valve for transmitting of fluids. In particular, disclosed herein is a switching valve for filling of gas tanks having a housing with an inlet area and an outlet portion. A check valve, a vent valve, and an inlet valve can be disposed within the housing. The vent valve and the inlet valve can be controlled by a slide that is coupled with a pivoting lever which is actuated by a control valve in a pressure controlled manner.

15 Claims, 1 Drawing Sheet

SWITCHING VALVE WITH SLIDER

BACKGROUND

1. Field

The invention relates to a switching valve for the transmission of fluids, in particular to the filling of gas tanks.

2. Description of the Related Art

Transmitting systems with such switching valves achieve a safe transmission of a fluid from a pressure source to a gas tank, for example in a fuelling system. Therein the simple operability and safety against contamination is of particular importance. Thus, U.S. Pat. No. 6,769,450 describes a valve system in which possible contamination from back flowing gas is prevented by a check valve such that residual quantities in the valve system are discharged by a vent valve in a controlled manner.

Further, WO 98/05898 of the Applicants describes a switching valve in the embodiment of a quick coupling, wherein a housing with a fluid inlet and a fluid outlet as well as several valves are provided in order to ensure a safe seal. These valves are controlled in a certain predetermined order by means of a control lever after connecting the quick coupling, whereby first the outlet valve will be opened, then the collets are closed with further movement of the control lever and finally the inlet valve is opened. Here, the control lever is an eccentric shaft with a sliding sleeve for actuating of the collets engaged with a sealing piston, which also releases the fluid inlet after complete coupling of the quick-connection. Further, a vent valve is provided for enabling pressure equalization before removing the quick-connect coupler even with high pressures without the risk of a backstroke. When closing the valves the exhaust valve works in type of a check valve. Although a safe connection is provided in this way, this coupling still has relative high manufacturing expenditure, in particular by the manual operation via the eccentric shaft.

Thus, the object of the invention is to provide a switching valve of the initially mentioned type that has a compact structure and enables simple handling as well as preventing contamination or a fluid reflux by controlled venting.

SUMMARY

The suggested switching valve with slide is suitable in particular for use in filling of gas tanks, whereby a simple and compact construction results since the switching valve with put-on control valve for pressure controlled operation of a pivoting lever is compact and stably formed in order to be integrated in filling systems in a space-saving manner.

The proposed pivoting lever is preferably designed with a leverage, i.e. with different lever lengths, so that a strong operation of the slide is achieved on actuating the valve. The piston of the control valve is preferably connected with the pivoting lever via a bolt, which is particularly arranged at a pivot axis in an intermediate housing. Thus, a sensitive control results, in particular when the piston surface cross sections of the piston are equally formed for the inlet and discharge openings. Further, a simple attachment to the valve housing is achieved, likewise a compact connection with a bypass line for actuating of the pressurized control valve.

BRIEF DESCRIPTION OF THE DRAWINGS

Subsequently an embodiment is explained and described by the accompanying drawing. Herein.

DETAILED DESCRIPTION

Figure 1:
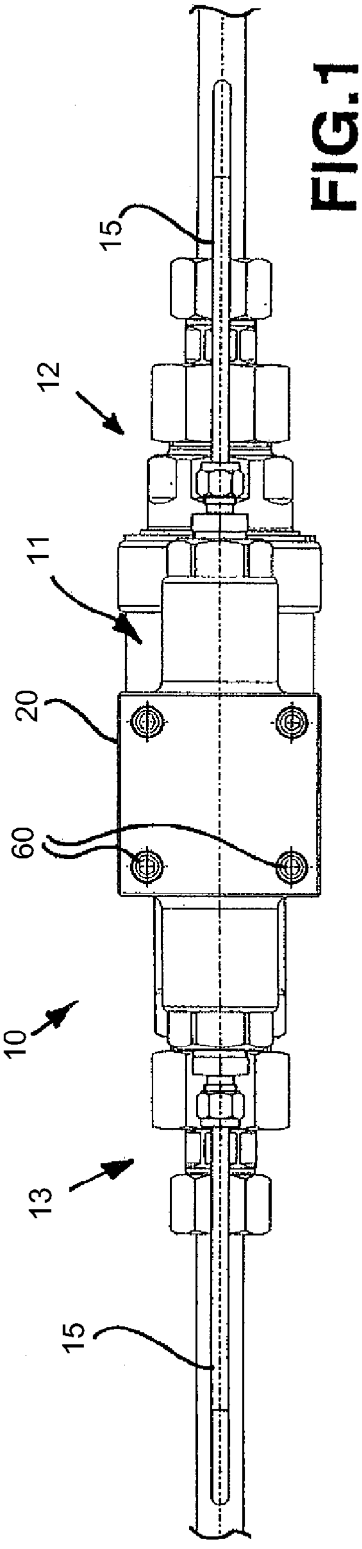
FIG. 1 is a plan view on a switching valve.
Figure 2:
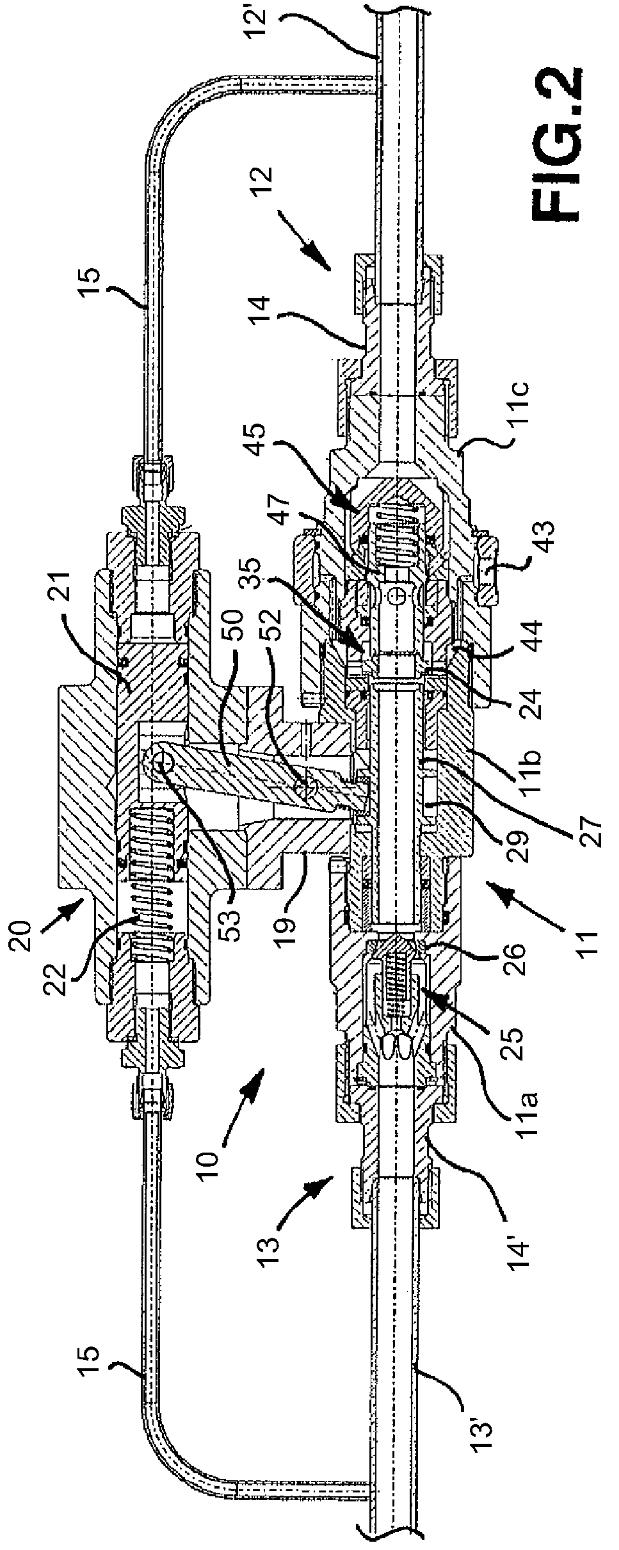
FIG. 2 is a side view of the switching valve with integrated inlet valve and vent valve, as well as a put-on control valve in longitudinal half-section.

FIGS. 1 and 2 show an embodiment of a switching valve 10. The switching valve 10 has a tubular housing 11 with some housing parts 11*a*, 11*b* and 11*c* bolted to each other, wherein the housing part 11*c* (here right side) serves as inlet area 12 and the left region as outlet portion 13 for forwarding of the fluid to be transferred. The inlet area 12 has an adapter 14, to which a fluid line 12' for supplying fluid to be transferred can be connected. The connecting adaptor 14 can be adapted to the fluid volume to be transferred, in particular to the desired passage cross sections etc., correspondingly. In the outlet portion 13 a corresponding adapter 14' is provided for the discharge conduit 13'. Between the two conduits 12' and 13' a bypass line 15 is intermediate, thus applying the inlet pressure and the output pressure to a control valve 20, put on the housing 11, as subsequently explained.

The housing part 11*a* encloses a check valve 25 that is represented in FIG. 2 in a closed position, thus sealing against a valve seat 26 via spring pressure, in order to prevent a reflux from the outlet portion 13. In the middle housing part 11*b* the check valve 25 is followed to the right by a switching slide 27, which can axially move (here to the right) along the central axis and shift a sealing disc 24 of a vent valve 35 with this movement. The vent valve 35 and the switching slide 27 are here operated by swiveling of a pivoting lever 50, being coupled with the switching slide 27, e.g. by positive engagement via an annular groove 29.

Further, in the right housing part 11*c* an inlet valve 45 with an associated valve seat is disposed towards the inlet range 12. The inlet valve 45 is likewise shifted by the pivoting lever 50 and the coupling with the switching slide 27 in axial direction, since the switching slide 27 also shifts a valve slide 47 of the inlet valve 45 from the closed position (shown here) into the open position by the movement of the sealing disc 24 of the vent valve 35 towards the right side in type of a sequence control, so that the fluid inflowing from the inlet range 12 can flow through the hollow valve slide 47 and a passage in the sealing disc 24 as well as via the tubular switching slide 27 to the outlet 13, since check valve 25 is here also pressed into the open position by the filling pressure (of the fuelling system or another pressure source/filling pump).

As mentioned above, the housing 11 (including inlet valve 45, vent valve 35 and check valve 25 inserted therein) bears an intermediate housing 19 onto which the control valve 20 is fitted. In this valve 20 a piston 21 is inserted (and laterally sealed), and urged by a spring 22 to the right position, shown here. The two faces, which are exposed to the respective pressure in the bypass line 15, preferably possess the same dimension, such that the piston 21 can shift with smallest pressure differences between right (inlet) and left (discharge opening) side in a sensitive way. The response threshold pressure is defined by the spring 22. The piston 21 is coupled to the pivoting lever 50 by a bolt 53, so that the control valve 20 can operate the valves 35 and 45 via the slide 27 in a pressure controlled manner.

If the pressure in the inlet range 12 (here right side) is higher than on the outlet side 13, as this is the case on starting and performing a filling operation, then first the piston 21 is moved to the left side here and the slide 27 is moved to the right (by swiveling the pivoting lever 50 in anticlockwise direction). The vent valve 35 is also closed and the inlet valve 45 is pressed into open position. As described above, the fluid then flows through the hollow slide 27, pushes the check valve 25 into open position and flows to the gas tank (to be filled) via the outlet portion 13.

Then, the pressure on the outlet side becomes larger than the inlet pressure on the end of the filling operation (with filled gas tank or shutdown of the filling pump), such that the piston 21 goes back into the starting position, shown here (right stop), whereby the pivoting lever 50 makes the slide 27 to move again to the left, so that the inlet valve 45 becomes closed, but the vent valve 35 will still be open, in order to bleed out the space between inlet valve 45 and check valve 25, likewise closed in the meantime (because of the missing inlet pressure). On this swiveling of the pivoting lever 50 (in the clockwise direction) the switching slide 27 is moved to the left, so that the sealing disc 24 of the vent valve 35 releases from its sealing position. Here, the sealing disc 24 and the switching slide 27 as well as the valve slide 47 slightly separate from each other into axial direction, so that the pressure can diminish itself to a pressure balance area 44, which is formed around the sealing disc 24 as recess-like annular space in a gradation at the housing part 11*c*.

On opening the vent valve 35 by the switching slide 27, as described above, pressurized fluid "caught" in the switching valve escapes via the pressure balance area 44 to a bleed bore 43 at the housing part 11*c*, in order to flow into a recycling hose or a tank or into the atmosphere, if the fluid is not dangerous.

As regards the pivoting lever 50 it is pointed out that the lever prolongations on both sides of the pivot axis 52 are different, e.g. here in the ratio 3:1, so that force leverage is achieved. Thus, a strong operation of the slide 27 and the valves coupled thereto is achieved, even with relative small construction of the control valve 20 (and/or diameter of the piston 21). This transmission can be easily changed e.g. by changing the intermediate housing 19 and the pivot axis 52 or extension of the pivoting lever 50 located therein, f. i. for adapting to respective filling pressures. Thus, application of the switching valve 10 with a control valve 20 saddled thereon, is more variable, in particularly when the change, if necessary, is rapidly made by means of screws 60 (cf. FIG. 1). Further, it should be emphasized that the bypass line 15 can also be connected to the adapters 14, 14' or directly at the respective inlet/outlet portion 12, 13 of the housing 11, in order to improve the compactness of the pressure controlled valve.

The invention claimed is:

1. A switching valve for transmitting of fluids comprising an inlet area and an outlet portion at a housing, in which a check valve, a vent valve and an inlet valve are disposed, wherein the vent valve and the inlet valve are controlled by a slide, wherein the slide is coupled with a pivoting lever, which is actuated by a control element in a pressure controlled manner.

2. The switching valve according to claim 1, wherein the control element is connected at the inlet area and at the outlet portion with a bypass line.

3. The switching valve according to claim 1, wherein the pivoting lever engages in an annular groove of the slide.

4. The switching valve according to claim 1, wherein the switching is for filling of gas tanks.

5. The switching valve according to claim 1, wherein the control element is a pressure responsive piston.

6. The switching valve according to claim 1, wherein the pivoting lever is asymmetrically arranged at a pivot axis in relation to its length.

7. The switching valve according to claim 6, wherein the pivoting lever has a lever length transmission of 3:1 or more.

8. The switching valve according to claim 1, wherein the pivoting lever is hinged at a piston of the control element.

9. The switching valve according to claim 8, wherein the piston is loaded by a spring.

10. The switching valve according to claim 8, wherein the piston has same piston cross-sections at the inlet side and the discharge side.

11. The switching valve according to claim 8, wherein the pivoting lever is hinged at the piston by a bolt.

12. The switching valve according to claim 1, wherein the control element is fitted onto the housing.

13. The switching valve according to claim 12, wherein the control element is fitted onto the housing at a middle housing part.

14. The switching valve according to claim 12, wherein the control element is fixed via screws at an intermediate housing.

15. The switching valve according to claim 14, wherein the intermediate housing also houses the pivot axis.

* * * * *